March 1, 1927.  1,619,432
V. MULHOLLAND
GUIDING DEVICE FOR MOLTEN GLASS
Filed Jan. 6, 1922
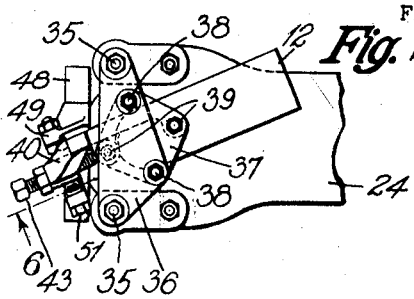
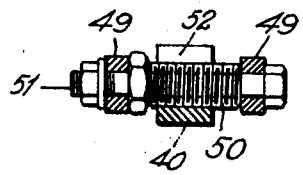
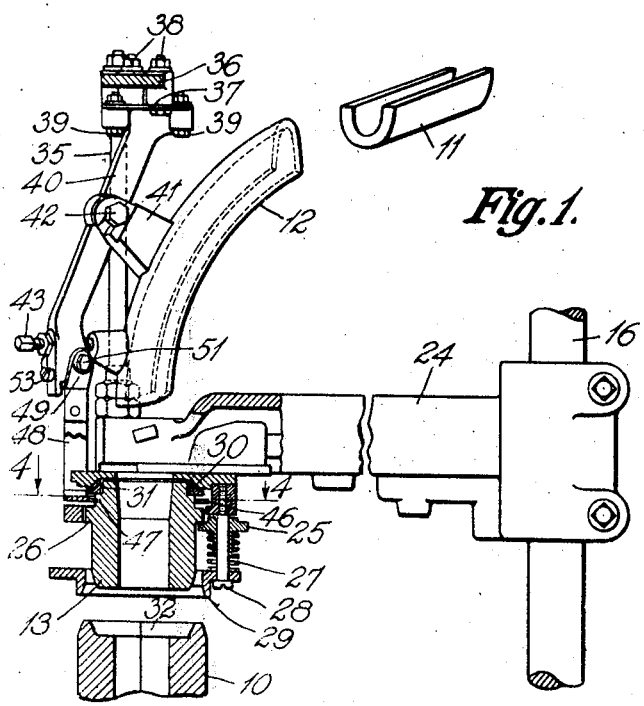
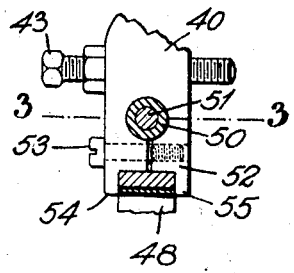
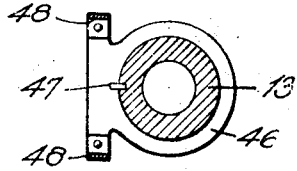
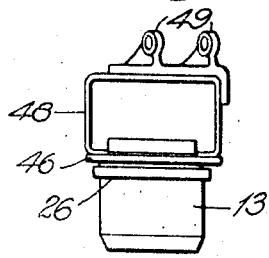
Inventor:
Vergil Mulholland
by: *Atty.*

Patented Mar. 1, 1927.

1,619,432

UNITED STATES PATENT OFFICE.

VERGIL MULHOLLAND, OF WEST HARTFORD, CONNECTICUT, ASSIGNOR TO HARTFORD-EMPIRE COMPANY, OF HARTFORD, CONNECTICUT, A CORPORATION OF DELAWARE.

GUIDING DEVICE FOR MOLTEN GLASS.

Application filed January 6, 1922. Serial No. 527,300.

This invention relates to machines for shaping molten glass, and more particularly to the devices employed in such machines for guiding the molten glass charges to the molds. The broad object of the invention is to provide guiding means for directing charges of molten glass to a mold or to successive molds, which guiding means can be adjusted both manually and automatically in accordance with variation in the position of the receiving mold, so that the charge will be delivered centrally, or in other desired or predetermined relation, to the mold cavity, notwithstanding slight variations in the position of the mold.

The guiding means may deliver the charge directly to the mold, but the specific embodiment of the invention includes a deflector which guides the charge to another guide, herein shown as a collar or funnel which in turn, directs it to the mold. When the mold is in receiving position, the collar becomes, in effect, a part of the mold and therefore in the broader aspect of the invention the deflector may be considered as delivering directly to a mold part.

The various features employed for the accomplishment of these and such other objects as may hereinafter appear will best be understood from the following description and accompanying drawings of a preferred embodiment of the invention, in which:

Figure 1 is an elevation, partly in section, showing a portion of a glass shaping mold, means for delivering a charge of molten glass, and a charge guiding device interposed between the delivering means and the mold;

Fig. 2 is a plan of the end of the guiding device;

Fig. 3 is a horizontal section taken on the line 3—3 of Fig. 6, showing the means for manually adjusting the relation between the guiding device and the mold;

Fig. 4 is a horizontal section taken on the line 4—4 of Fig. 1;

Fig. 5 is a detail view looking from the left in Fig. 1, showing a part of the connections to the mold by which the guiding member is automatically positioned; and Fig. 6 is a detail elevation, in section, taken on the line 6 of Fig. 2.

The invention is here shown as applied to a well-known type of glass shaping machine in which a series of molds mounted on a rotatable turret, are successively placed in charge receiving position. It is desirable to deliver the charge of molten glass to the mold in a predetermined relation thereto, usually in the center of the mold cavity. The successive molds sometimes vary slightly in their charge receiving positions and the present guiding device is movably mounted so that its lower end is free to move in any direction and is thus moved by connection with the mold so that the charge will always be delivered in a predetermined relation to the mold cavity.

A glass shaping mold 10 (Fig. 1) may be one of a series carried by a turret, and successively positioned to receive charges dropping from above or delivered from an inclined chute 11 which may be similar to that shown in U. S. Patent No. 1,264,328. The guiding device is supported above the mold by an arm 24 adjustably secured on a sliding rod 16 and comprises a deflector 12 and a collar or funnel 13.

In order to permit the lateral removal of a charged mold and the substitution of an empty mold in charge receiving position, the guiding device is also arranged to be periodically moved vertically toward and from the mold, and it may also be swung laterally out of the way while elevated, if desired. The guiding device is reciprocated vertically, by a cam 14 actuating a lever 15 operatively connected with the vertical rod 16 on which the guiding device is mounted. The device is moved yieldingly toward and into contact with the mold 10, notwithstanding slight variation in its height, by a yielding connection between the lever 15 and the rod 16. The lever 15 engages a spool 17 loosely mounted on the rod between a fixed collar 18 and a spring 19 supported by a nut 20 on the lower end of the rod. When the collar 13 of the guiding device engages the mold top, the downward movement of the rod 16 is stopped and further movement of the spool 17 by the cam 14, compresses the spring 19 and holds the guiding device firmly against the top of the mold.

If it is desired to swing the device laterally during its elevated period, the collar 18 may be provided with a gear segment 21 for engagement with a suitable rack operated by any suitable cam.

Besides the varying lateral positions in which the successive molds come to rest to receive the charge, they are also liable to be somewhat tilted in different directions. In order that the charge may be directed centrally into the mold under these circumstances, the guiding members are articulated, and the funnel or collar 13 is loosely mounted on the arm 24 and arranged to align itself with the mold upon contact therewith. The collar is supported below the arm by a number of washers 25 (but one being illustrated) held yieldingly up against a flange 26 formed on the collar 13, by springs 27 surrounding studs 28 rigidly connected with the arm 24. These springs also serve to hold a mold clamping ring 29 yieldingly downward against the heads of the studs 28 until it is lifted by engagement with the mold, the halves of which are thus clamped together by the beveled edges of the ring 29.

A universal joint is formed between the collar 13 and the arm 24, by a ring 30 having a spherical surface received in a complemental recess in the lower surface of the arm, which permits the collar to shift angularly into alignment with the mold cavity under any tilting action of the upper surface of the mold. The center of the spherical seat of the collar is preferably in the plane of its lower or mold engaging surface, whereby angular movement of the collar does not of itself produce lateral displacement of that lower surface. The collar is however permitted to shift laterally into alignment with the mold by providing a clearance indicated at 31, between the collar and the opening in the ring 30. The lower end of the collar is chamfered to enter a recess 32 in the top of the mold, by which the collar is moved bodily in its ring 30, into alignment with the mold.

Lateral movement of the collar on the arm, whether bodily or angularly, would destroy its alignment with the deflector 12 if the deflector were fixed, so that the mold charge might strike the side of the collar, resulting in deformation of the charge and an improper delivery to the mold. The upper portion of the deflector is held in a substantially fixed charge receiving position, while the lower end is laterally movable and is automatically positioned by the mold in accordance with the position of the mold. In the illustrated embodiment of the invention, the deflector 12 is thus positioned by its connection with the funnel or collar 13, so as to deliver the charge in proper relation to the collar which, in turn, guides the charge to the mold.

The deflector is supported by a flexible connection, which is in effect a universal joint, so positioned that movement of the lower or delivery end of the deflector will not produce sufficient movement of the upper end to remove it from proper receiving relation to the falling mold charge, or to the end of the chute 11, when such a chute is employed. The deflector is supported by two rods 35 fixed in the end of the arm 24 and connected at the top by a bridge member 36. The universal joint, having but slight movement, is formed by a plate 37 of flexible sheet material, of which two opposite corners are secured to the bridge member by screws 38. Two other corners of the plate 37 are connected by screws 39 with an arm 40 which, by the flexure of the plate 37, is movable laterally in any direction to a sufficient extent. The deflector 12 is pivotally secured to the arm 40 by a lug 41 and screw 42 and its position relative to the arm may be adjusted by a stop screw 43 threaded in the arm and bearing against a boss on the deflector.

The lower end of the deflector 12 is moved in accordance with the position of the mold by a connection between the arm 40, on which the deflector is adjustably fixed, and the collar 13. The collar is surrounded near its upper end by an annular plate 46 (Figs. 1, 4 and 5) fixed from rotation on the collar by a pin 47. One side of the plate 46 is extended to carry a rectangular frame 48 (Fig. 5) provided with a pair of ears 49 by which the frame is adjustably attached to the arm 40. A tubular screw 50 (Figs. 3 and 6) is threaded through the lower end of the arm 40 and positioned between the ears 49, on a bolt 51 passing through the screw and the ears. The screw 50 may be turned to move the lower end of the arm 40 toward one or the other of the ears 49 to adjust the relation between the deflector and the collar, and the screw may be locked in adjusted position by a clamp 52 and screws 53 (Figs. 3 and 6). One part of the clamp is threaded to engage the screw 50, and the lower part is provided with a ledge 55 which clamps against a ledge 54 on the arm 40 to make a rigid connection between the arm 40 and the frame 48 when the hollow screw 50 is locked in position. This connection between the deflector 12 and the collar 13, comprising the arm 40, screw 50, frame 48, plate 46 and the other associated parts, provides means for swinging the deflector 12 in accordance with the movement of the collar 13 so as to maintain a predetermined but adjustable receiving and delivering relation between the two guiding members.

In the operation of this mechanism, the mold 10 is placed in approximate charge receiving position by any suitable mechanism, such as a turret. The cam 14 then lowers the guiding device, bringing the lower end of the collar 13 into contact with the mold and thereafter compressing the spring 19. If the mold and guiding device are in perfect alignment, the charge may be delivered centrally through the collar 13 without contact therewith. The recess 32 in the mold top causes the collar to align itself with the mold cavity if there is error in the alignment. The movement of the collar is transmitted through the plate 46, and frame 48, to the lower end of the arm 40, swinging it about its universal pivot formed by the plate 37. The deflector 12, adjustably fixed on the arm, is thus positioned in accordance with the position of the mold, to deliver a mold charge centrally through the collar 13 into the mold. The relation between the lower or delivery end of the deflector and the collar may be manually adjusted by the screws 43 and 50. After the mold has been charged, the guiding device is lifted by the cam 14 and then lowered and re-positioned in similar cooperation with the next mold.

For some uses the separate collar or funnel 13 may be omitted, and the deflector 12 may be extended downwardly so that it discharges directly into and is positioned directly by the mold.

The different features of this invention may be modified or rearranged in various ways within the skill of a competent designer of this class of machinery to adapt it for the accomplishment of the object sought, without departing from the spirit of the invention as expressed in the appended claims.

I claim:

1. Apparatus for controlling the delivery of mold charges to a mold, comprising a plurality of relatively movable guiding members for the charges, one of said members being arranged to be moved by the mold and to thereby actuate another of the guiding members, to maintain them in proper alignment with each other.

2. Apparatus for operating on molten glass, including a mold, and a plurality of articulated guiding members for controlling the delivery of mold charges to the mold, one of said guiding members being controlled by the mold to effect control of another guiding member, whereby said members are maintained in proper delivering relation with respect to each other and to the mold.

3. Apparatus for operating on molten glass, including a mold, a plurality of relatively movable guiding members for controlling the delivery of mold charges to the mold, one of which is adapted to be positioned by the mold, and articulated connections between said guiding members to automatically maintain them in proper delivering relation.

4. Apparatus for operating on molten glass including molds, a pivotally mounted deflector for guiding mold charges to the molds, and means controlled by the mold positions for swinging the discharge end of the deflector on its pivotal mounting into proper relation to varying mold positions.

5. Apparatus for operating on molten glass, including a mold, a guide through which the glass is delivered to the mold and arranged to be positioned by the latter, a deflector for controlling the delivery of the glass to the guide, and means controlled by the guide for positioning the deflector with respect thereto.

6. Apparatus for operating on molten glass, including a mold, a movable support, a guide loosely carried by the support for controlling the delivery of mold charges to the mold and being free to be positioned by the mold, a deflector carried by the support for controlling the delivery of the charges to the guide, an articulated connection between the guide and the deflector to allow of positioning the deflector and the guide relative to each other, and means for moving the support to move the guide into cooperative relation with the mold.

7. Apparatus for operating on molten glass, having in combination a mold, a movable support, a guide for the glass mounted for lateral movement relative to the support, to allow the guide to be positioned by the mold, an arm flexibly connected with the support, a pivotal connection between the arm and guide, a deflector adjustably mounted upon the arm and arranged to be positioned thereby to control the delivery of the glass to the guide, and means for moving the support to bring the guide into position to be laterally positioned by the mold.

8. Apparatus for operating on molten glass, including a mold, a movable support, a plurality of relatively movable guiding members carried by the support for controlling the delivery of mold charges to the mold, one of which guiding members is arranged to be positioned by the mold, connecting means between said guiding members arranged to automatically maintain them in proper relative delivering alignment, and means for moving the support to bring the guiding members into position to cooperate with the mold.

9. A device for guiding molten glass into a mold, comprising a deflector mounted on a universal joint, and means actuated by the mold for positioning the deflector in delivering relation to varying mold positions.

10. Apparatus for operating on molten glass, having in combination an arm movable toward and from a mold, a deflector, a universal joint connecting the deflector and the arm, and means for moving the deflector about said joint, to position it in delivering relation to the mold.

11. Apparatus for operating on molten glass, having in combination a mold, a collar through which glass is delivered to the mold, means to permit the collar to move into alignment with the mold upon contact therewith, a deflector for delivering a mold charge to the collar, and connections between the collar and the deflector for preserving the delivering relation therebetween.

12. Apparatus for operating on molten glass, having in combination, a mold, a collar through which glass is delivered to the mold, means for moving the collar into engagement with the mold, means to permit the collar to move angularly and laterally into alignment with the mold, a deflector for directing glass to the collar, and means for maintaining delivering relation between the deflector and the collar.

13. Apparatus for guiding a charge of molten glass to a shaping mold, comprising an inclined chute from which the charge is discharged, a deflector having its receiving end positioned in the path of the discharging charge, and means actuated by engagement with the mold for positioning the delivery end of the deflector in delivering relation to the mold.

14. Apparatus for guiding a charge of molten glass to a shaping mold, comprising an inclined chute from which the charge is discharged, a deflector, means for moving the receiving end of the deflector toward the mold into the path of the discharging charge, and means for simultaneously moving the delivery end of the deflector laterally into delivering relation to the mold.

15. Apparatus for guiding charges of molten glass into a mold, including two relatively movable guiding members, means connecting the members for moving one upon movement of the other, one of said members being arranged to engage with the mold and to be positioned thereby.

16. Apparatus for guiding charges of molten glass into a mold, comprising a mold engaging guide member, a support having a ball and socket connection with said member, means for relatively moving the support and the mold to bring the mold and the member into engagement whereby the member is moved angularly about said connection, means to move the member laterally independently of the joint into alignment with the mold, a deflector arranged to deliver the charge to the member, and connections between the member and the deflector whereby it is moved into delivering relation to the member when the member is moved by engagement with the mold.

17. Apparatus for guiding charges of molten glass to a receptacle, comprising a chute from which the charge is discharged, a deflector for receiving the charge from the chute and guiding it to the receptacle, and a pivotal mounting for the deflector so positioned that the discharge end of the deflector may be moved without displacing the receiving end thereof from receiving position.

18. Apparatus for guiding charges of molten glass to a receptacle, comprising an inclined chute along which the charges slide by gravity, and a curved deflector having one end pivotally mounted in receiving relation to the discharge end of the chute, whereby the discharging end of the deflector may be adjusted laterally without displacing the receiving end from receiving position.

Signed at Hartford, Connecticut, this 5th day of January, 1922.

VERGIL MULHOLLAND.